(12) United States Patent
Morris

(10) Patent No.: US 12,491,106 B2
(45) Date of Patent: Dec. 9, 2025

(54) APPARATUS AND METHODS FOR TREATMENT OF BRUXISM

(71) Applicant: Andrea Morris, St. Louis, MO (US)

(72) Inventor: Andrea Morris, St. Louis, MO (US)

( * ) Notice: Subject to any disclaimer, the term of this patent is extended or adjusted under 35 U.S.C. 154(b) by 12 days.

(21) Appl. No.: 18/815,674

(22) Filed: Aug. 26, 2024

(65) Prior Publication Data

US 2025/0064627 A1 Feb. 27, 2025

Related U.S. Application Data

(60) Provisional application No. 63/534,720, filed on Aug. 25, 2023.

(51) Int. Cl.
*A61F 5/56* (2006.01)
*A61B 5/00* (2006.01)

(52) U.S. Cl.
CPC ............ *A61F 5/566* (2013.01); *A61B 5/4557* (2013.01); *A61B 5/4848* (2013.01); *A61B 5/682* (2013.01); *A61F 2005/563* (2013.01)

(58) Field of Classification Search
CPC .... A61F 5/56; A61F 5/566; A61F 5/58; A61F 2005/563; A61C 5/88; A61C 5/90; A61C 5/82; A61B 1/24
USPC ........................................................ 128/848
See application file for complete search history.

(56) References Cited

U.S. PATENT DOCUMENTS

| | | | |
|---|---|---|---|
| 3,857,181 A * | 12/1974 | Rappaport | A61C 5/82 433/139 |
| 6,213,772 B1 | 4/2001 | Costello | |
| 12,290,418 B2 | 5/2025 | Nguyen | |
| 2005/0103331 A1* | 5/2005 | Wedemeyer | A61F 5/3707 128/207.14 |
| 2011/0226264 A1* | 9/2011 | Friedman | A61B 1/267 128/848 |
| 2011/0232651 A1 | 9/2011 | Diers | |
| 2015/0297390 A1 | 10/2015 | Schlatter et al. | |
| 2017/0224987 A1* | 8/2017 | Kent | A61B 5/0826 |
| 2024/0285948 A1* | 8/2024 | Loh | A61B 5/4818 |

FOREIGN PATENT DOCUMENTS

JP 3210257 U 5/2017

OTHER PUBLICATIONS

Corsearch, Trademark Status Information on U.S. Trademark Application Serial No. 97-354967, filed Apr. 8, 2022, generated Dec. 13, 2024, 3 pages.
International Search Report and Written Opinion in PCT/US2024/043912, mailed Dec. 8, 2024, 15 pages.

* cited by examiner

*Primary Examiner* — Adam Baker
(74) *Attorney, Agent, or Firm* — Lewis Rice LLC

(57) ABSTRACT

An apparatus for treating bruxism comprising a main body element, a knob element, and a treatment arm. The main body roughly resembles a flattened golf club head and may have a recess on top, and is connected via the treatment arm to the knob element. The exterior of the apparatus has a smooth construction, with rounded edges lacking sharp corners or points, to assist with placement and comfort. When in use, the main body is placed in the cheek pocket and the treatment arm hooks behind the back molar, where it produces discomfort when fully biting down, thereby discouraging tooth-grinding during slumber.

24 Claims, 19 Drawing Sheets

APPARATUS AND METHODS FOR TREATMENT OF BRUXISM

CROSS-REFERENCE TO RELATED APPLICATIONS

This application claims the benefit of U.S. Prov. Pat. App. Ser. No. 63/534,720, filed Aug. 25, 2023, the entire disclose of which is incorporated herein by reference.

BACKGROUND OF THE INVENTION

Field of the Invention

This disclosure is related to bruxism, and in particular, to an apparatus for the treatment of bruxism.

Description of the Related Art

Tooth grinding, or bruxism, is a medical condition characterized by the involuntary grinding, clenching, or gnashing of teeth. It can occur during sleep (where it is known as nocturnal bruxism) or while awake, and affects individuals of all ages. The exact causes of bruxism remain unclear, but it is believed to be influenced by factors such as stress, anxiety, abnormal bite, dental issues, and sleep disorders. Symptoms of tooth grinding include audible grinding or clenching sounds, worn-down teeth, jaw pain, headaches, and tooth sensitivity. If left untreated, bruxism can lead to dental damage, jaw disorders, and other complications.

In the natural relaxed state, the top and bottom teeth should be separated by about 2-3 mm of space. Teeth usually come into contact with each other when chewing and swallowing, using a force of less than 25 pounds of pressure, with food to buffer direct contact with chewing. Bruxism results in an abnormal increase in magnitude, frequency and duration of elevated pressure, increasing maximum biting force to as much as 200 to 300 pounds. This grinding is three to ten times more powerful than ordinary mastication. Further, functional tooth contact during a 24-hour period should be approximately 20 minutes, but the excessive forces generated by bruxism are in addition to the forces normally applied during that 20 minute period, and can extend for more than 20 minutes. Untreated bruxing can change normal physiologic wear to severe wear, leading to fatigue failure and fractures.

Treatment options are limited, and there is no known cure. Therapies are generally preventative in nature, and involve protecting the teeth and other structures of the mouth. Dental interventions like mouthguards are common, and attempts at treating underlying causes, such as stress management techniques, addressing dental problems, medication, and behavior modification, have only limited success. They also tend to be time-consuming, invasive, and expensive.

Because of these and other problems in the art, described herein, among other things, is an oral appliance for treating bruxism. The appliance generally consists of a knob element connected to a main body element by an arm. The main body element is sized and shaped to be placed and held within, and to generously fill, an air pocket (chiefly comprised of the buccal vestibule) within the oral cavity generally located between the interior of the cheek and the exterior side of the teeth. Generally, the contours of the apparatus follow the skeletal anatomy, and that of other resistive tissues in the operative region of the oral cavity. The knob element is sized and shaped to anchor the oral appliance within the hamular notch. When the oral appliance is in place, the treatment arm passes from the knob element through the hamular notch to the main body element. These and other elements are described in further detail herein.

To properly understand the invention, it is important to understand the anatomy of the mouth and teeth. At a high level of generality, the human mouth, also sometimes referred to as the oral cavity, is a relatively complex anatomical structure, due in part to the fact that it provides a number of different survival functions, ranging from food processing (mastication and swallowing) to both verbal and non-verbal communication. The oral cavity is comprised of several interconnected components.

At a high level of generality, the oral cavity is defined externally by the lips and cheeks. Internally, the roof of the mouth is formed by the hard palate at the front and the soft palate at the back, which separates the oral cavity from the nasal cavity above. The floor of the mouth consists of muscles and connective tissues. The tongue is disposed at the bottom center of the oral cavity, providing familiar functions (taste perception, food manipulation, and speech). Surrounding the oral cavity are the teeth, which are anchored in the alveolar bone of the upper and lower jaws by periodontal ligaments. Inside the cheeks, there are small elevations of tissue called buccal fat pads, which help with the proper positioning of the teeth and contribute to facial shape.

More specifically, the anatomy of the mouth is divided into two components: the maxillary anatomy (top) and the mandibular anatomy (bottom). Although both parts of the mouth have some features in common, they are not symmetric. The pertinent structures of maxillary anatomy for purposes of the present invention are primarily the buccal vestibule, which is limited by the buccal frenum and the hamular notch. In plainer terms, the buccal vestibules are the portions of the interior of the mouth located between the inside of the cheeks and the outside of the molars, towards the back of the mouth. This region is defined by the buccal frenum, which forms the dividing line between the buccal vestibules and the labial vestibule (the regions between the teeth and cheeks towards the front of the mouth). The present invention is sized and shaped to be received and retained within the buccal vestibules, but to avoid contacting the buccal frenum.

Another structure that may be pertinent to understanding the invention is the buccal frenum. For purposes of this disclosure, frenums are small, elastic tissues that connect various oral and facial structures. Frenums can be activated and repositioned through muscular activity. As noted above, the buccal frenums form the forward boundary of the two buccal vestibules. It is known in the art that the buccal frenums require a significant degree of clearance for action.

Another structure defining the buccal vestibule is the maxillary tuberosity, which is the backmost structure in the upper jaw. This structure is usually disposed higher in the facial structures than any other border of the buccal vestibule, and contains the sockets of the upper wisdom teeth. The far back (posterior) border of the maxillary tuberosity tends to curve upwards and away from the oral cavity. Opening the mouth wide significantly alters the shape and configuration of this space, which generally becomes constricted by other oral structures.

The distal limit of the maxillary buccal vestibule is a structure known as the hamular notch. The hamular notch has a mucous membrane consisting of loose tissue, which can be safely moved by a dental device. However, a dental device should not extend too far into the hamular notch because tissues in that region can become traumatized by prolonged contact.

On the bottom jaw, also known as the mandibular anatomy, mandibular buccal vestibules extend from the buccal frenum to the outside back corner of a structure known as the retromolar pad. Within the mandibular buccal vestibule, a structure known as the buccal shelf extends from the buccal frenum to the retromolar pad. Medially (towards the middle), the mandibular buccal vestibule is bound by the ridge crest (the top of the lower jaw, where teeth are located, or would be located, for patients lacking teeth). Laterally, the lower buccal vestibule is defined by the external oblique ridge of the mandible.

The mucous membrane in this area is more loosely attached and less keratinized, which generally means the tissue is softer and less resilient. However, the bone of the buccal shelf is a smooth, firm, cortical bone, and it happens to lie at right angles to vertical occlusal forces, making it a suitable location for comfortable device retention and loading, if necessary.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is an apparatus for treating bruxism in a human comprising: a main body element comprising a dorsal side and an opposing ventral side, and a buccal side and an opposing lingual side, the main body element further comprising a smooth exterior surface, and the main body element being sized, shaped, and dimensioned to be placed and passively retained within a buccal vestibule of an adult human; a knob element; and a treatment arm extending from the main body element to connect the knob element to the main body element, the treatment arm being sized, shaped, and dimensioned to be placed and held in vacant retromolar space, and to inhibit upper and lower teeth from contacting each other without the adult human experiencing intolerable discomfort.

In an embodiment of the apparatus, a maximum height between the dorsal side and the ventral side is effective to cause at least a portion of the main body element to extend above the visible base of the maxillary molars of the adult human when worn while the mouth is in a closed, resting position.

In an embodiment of the apparatus, the maximum height is effective to inhibit the main body element from slipping past the teeth of the adult human when the jaw is opened to its maximum extent.

In an embodiment of the apparatus, the maximum height is between about 28.0 mm and about 37.0 mm.

In an embodiment of the apparatus, the maximum height is effective to cause at least a portion of the main body element to extend below the visible base of the mandibular molars of the adult human when worn while the mouth is in stasis position.

In an embodiment of the apparatus, the maximum height is effective to cause the main body element to fill a portion of the space between the dorsal boundary of the maxillary buccal vestibule and the ventral boundary of the mandibular buccal vestibule of the adult human when worn while the mouth is in stasis position In an embodiment of the apparatus, an end of the main body element distal the treatment arm curves inward from the dorsal side and the ventral side to connect at a first point having a maximum distance from the treatment arm.

In an embodiment of the apparatus, a tangent line to the first point is generally perpendicular to a major horizontal axis of the main body element.

In an embodiment of the apparatus, a maximum thickness of the main body between the buccal side and the lingual side is between about 6.0 mm and about 7.0 mm.

In an embodiment of the apparatus, the apparatus comprises a smooth transition zone from the main body element to the treatment arm.

In an embodiment of the apparatus, the buccal side and the lingual side curve inward towards each other at the distal end of the main body element to connect at a second point having a maximum distance from the treatment arm.

In an embodiment of the apparatus, the first point and the second point are the same.

In an embodiment of the apparatus, a maximum depth of the apparatus is between about 41.0 mm and about 48.0 mm.

In an embodiment of the apparatus, a cross-section of the knob element is generally in the configuration of an curvilinear polygon.

In an embodiment of the apparatus, the curvilinear polygon is selected from the group consisting of: a curvilinear triangle; a Reuleaux triangle; an irregular polygon.

In an embodiment of the apparatus, a maximum height of the curvilinear polygon in a first direction is about 12 mm and a maximum width of the curvilinear polygon in a second direction generally perpendicular to the first direction is about 9 mm.

In an embodiment of the apparatus, a cross-sectional area of the knob element is larger than a cross-sectional area of the treatment arm at a point adjacent the knob element.

In an embodiment of the apparatus, a maximum dorsal cross-sectional width of the treatment arm is about 8.0 mm and a maximum frontal cross-sectional width of the treatment arm is about 10.0 mm.

In an embodiment of the apparatus, a minimum distance between the adult human's upper and lower teeth without the adult human experiencing intolerable discomfort is selected from the group consisting of: less than about 3.0 mm; less than about 2.5 mm; less than about 2.0 mm; less than about 1.5 mm.

In an embodiment, the apparatus further comprises at least one sensor in the functional arm and at least one transmitter communicatively coupled to the at least one sensor.

In an embodiment of the apparatus, the sensor comprises a force sensor.

Also described herein, among other things, is a system for treating bruxism comprising: the foregoing apparatus; a computer having application software installed thereon, the application software programmed to receive wireless messages from the apparatus vis the transmitter and to display at least some of the content of the received wireless messages.

Also described herein is a method for treating bruxism comprising: an adult human inserting the foregoing apparatus into the oral cavity of the adult human and positioning the main body element within the space defined by adjacent maxillary and mandibular buccal vestibules, and positioning the treatment arm among the soft tissue behind the molars; the adult human slumbering while the apparatus is so inserted; and upon awakening, the adult human removing the apparatus from the oral cavity.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 1:
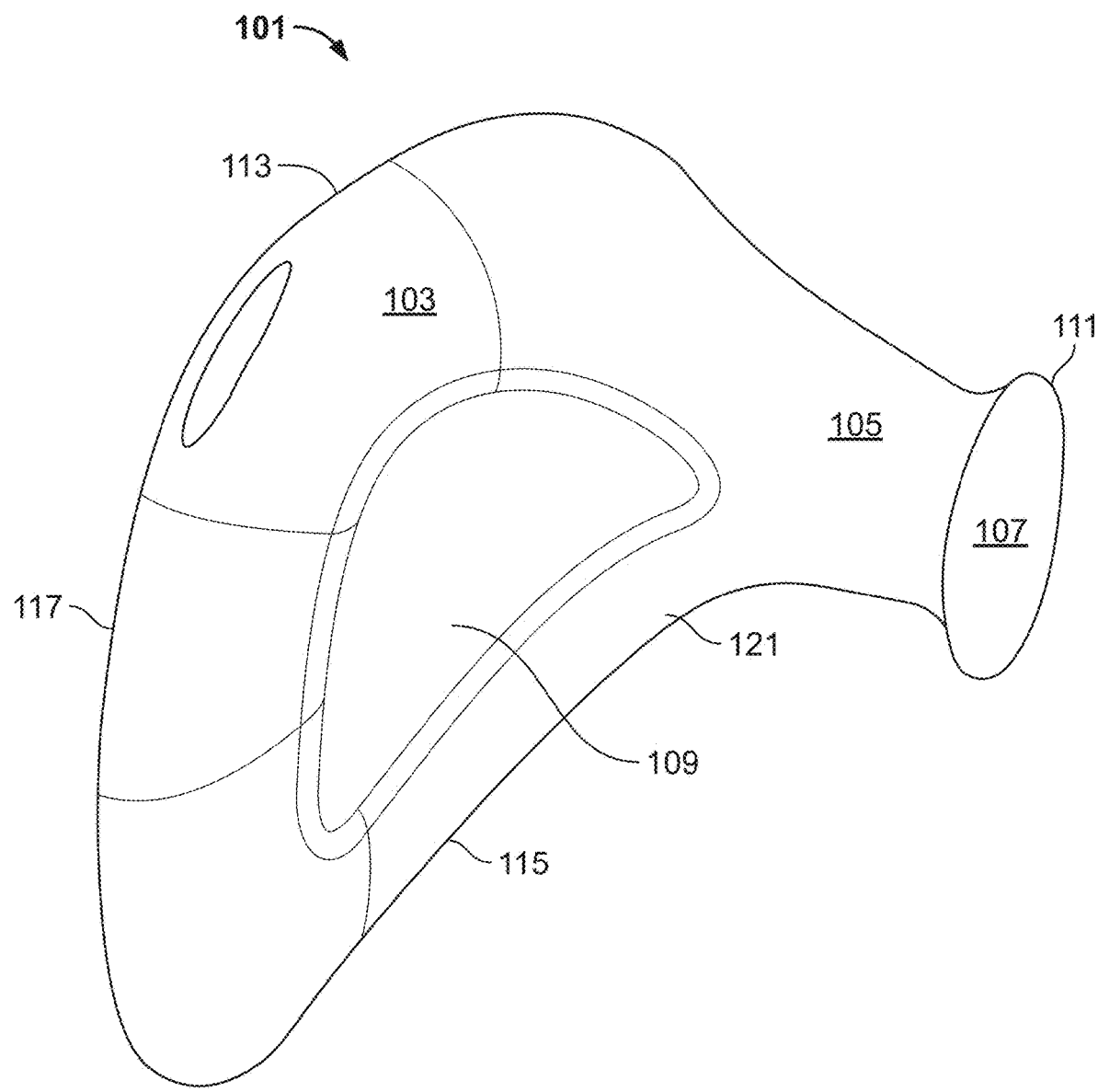
FIG. 1 depicts an isometric elevation view of an apparatus for treating bruxism according to the present disclosure.

FIG. 1 provides an isometric perspective view of an apparatus for treating bruxism according to the present disclosure. FIGS. 2-7 provide alternative views of this embodiment, and FIGS. 8-19 provide various perspective views of an alternative embodiment. As shown in the depicted embodiment, the apparatus is an oral appliance (101) comprising a main body element (103), a knob element (107), and a treatment arm (105). Generally, the main body is sized and shaped to be received and retained within the cheek pocket of the wearer, as described in further detail elsewhere herein. This may give rise to a main body having a number of different possible configurations, depending on the age, size, and unique anatomical structures of the particular wearer. In the depicted embodiment of FIG. 1, the main body element (103) has a generally egg-shaped, or ovoid, cross-section. To use non-medical terminology, the depicted main body element (103) could be described as roughly resembling a flattened golf club head with a recess (109) on top, turned on its side. The depicted main body element (103) has a smooth exterior surface construction with rounded edges lacking corners or points, which assists with placing and holding the main body element (103) within the oral cavity, without excess pain or discomfort, and while minimizing potential trauma to structures within the oral cavity.

Figure 2:
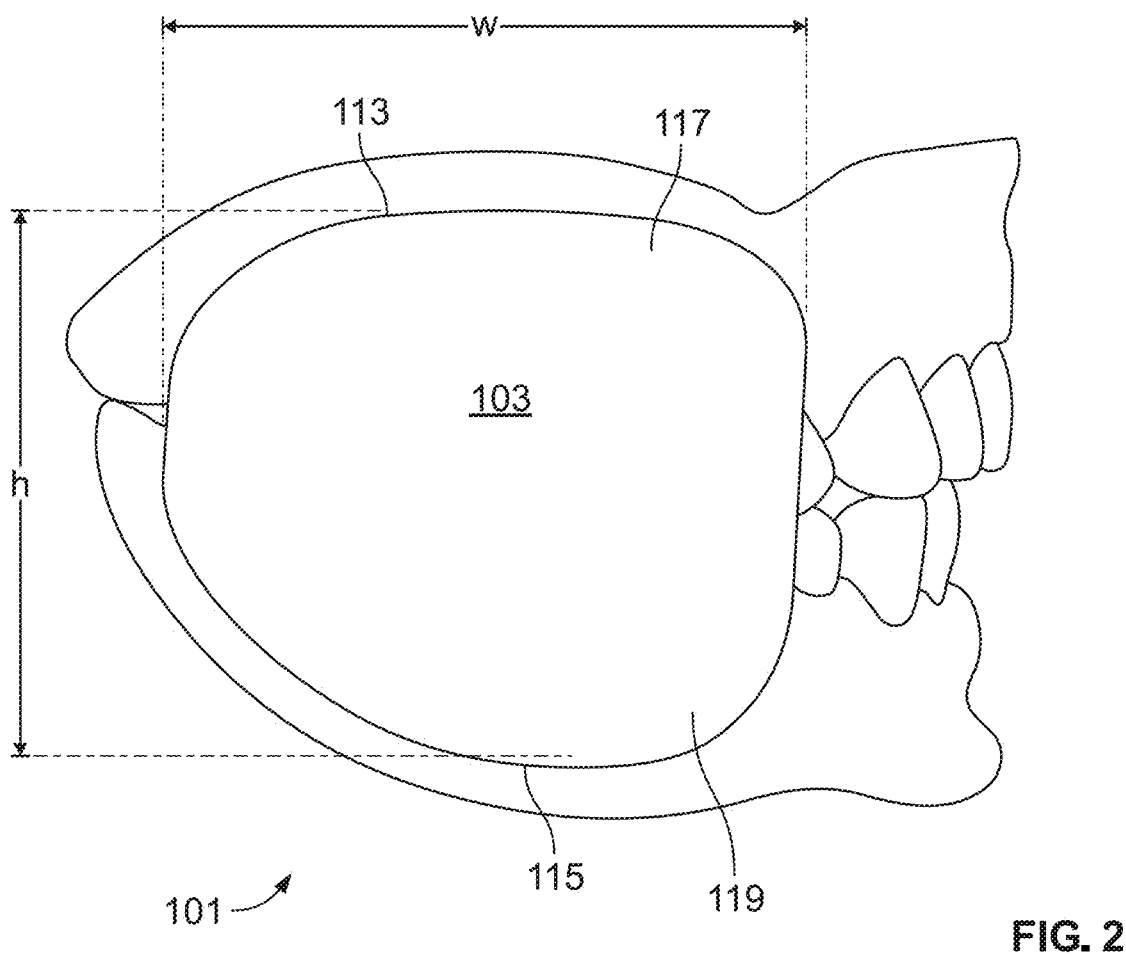
FIG. 2 depicts a side elevation view of an apparatus for treating bruxism according to the present disclosure in use by a patient.

The depicted main body element (103) has a dorsal side (113) and an opposing ventral side (115). Due to the rounded shape, the distance between the dorsal side (113) and ventral side (115) (the "height") is variable, but has a maximum extent, or maximum height, as shown in FIG. 2. When the oral appliance (101) is properly disposed within a typical human oral cavity as described herein, the main body element (103) will be disposed entirely, or almost entirely, within the space within the oral cavity defined by the adjacent maxillary and mandibular buccal vestibules. The fit should be comfortably snug with adjacent oral structures, but not uncomfortably tight or overly full. The fit should admit of some, but minimal, unintended movement, but not be so tight as to cause uncomfortable chaffing or pressure with adjacent structures.

By way of example and not limitation, in one embodiment, the maximum height h between the dorsal side (113) and ventral side (115) is about 28.0 mm. In another embodiment, h is about 37.0 mm. In still other embodiments, is a value between about 28.00 mm and about 37.0 mm. The exact maximum height may vary from embodiment to embodiment, as the precise configuration of the oral cavity can be highly variable due to factors such as, but not necessarily limited to, the age, sex, and height of the wearer. Generally, multiple heights will be available to accommodate users having differences in oral geometry, and differences in tolerance for wearing an oral appliance.

As shown in the depicted embodiments, the main body element (103) is rounded, with the end distal the arm (105) curving inward from the dorsal (113) and ventral sides (115) to connect at a point or line having a maximum distance from the arm (105). In an embodiment, a tangent line to this maximum point may be roughly perpendicular to the major horizontal axis of the main body element (103), but other locations for this maximum point are possible. As shown in the FIGURES, a cross section of the main body element (103) at the distal end would have the general appearance of a rounded square or rectangle.

Generally, the height will be selected so that the buccal vestibules are filled to the same proportion for the intended user as a 28.0 mm to 37.0 mm tall main body element would fill the buccal vestibules. In an embodiment, the height of the main body element (103) causes the main body element to extend above the visible base of the maxillary molars. In an embodiment, the height of the main body element (103) causes the main body element to extend below the visible base of the mandibular molars. In an embodiment, the height of the main body element (103) causes the main body element (103) to fill a partition of the space between the dorsal boundary of the maxillary buccal vestibule and the ventral boundary of the mandibular buccal vestibule when the mouth is in a closed resting position.

Figure 3:
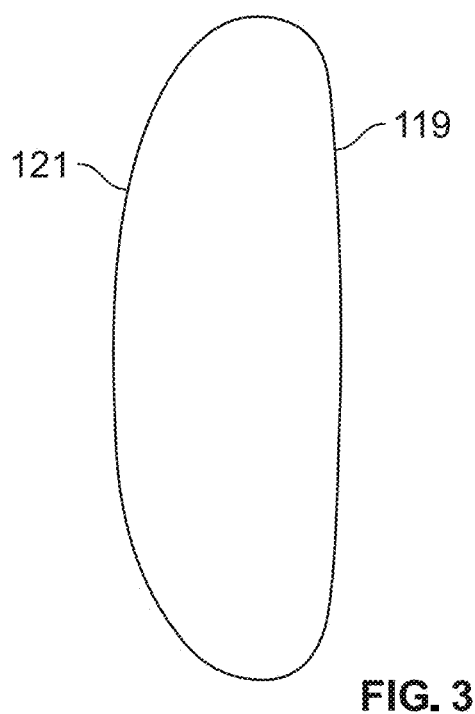
FIG. 3 depicts an elevation view of an apparatus for treating bruxism according to the present disclosure.

The depicted main body element (103) also comprises a pair of opposing lateral sides. A first side, the buccal side (119), is a generally flat surface, but, as described elsewhere herein, having smooth, rounded transitions to other structures to avoid producing edges or points. The buccal side (119) is generally adjacent to the interior of the cheek when the oral appliance (101) is in use. The second side, opposite the buccal side (119), is the lingual side (121), which also comprises the depicted recess (109) described elsewhere herein. The lingual side (121) has a more rounded profile, as shown in FIG. 3.

Figure 4:
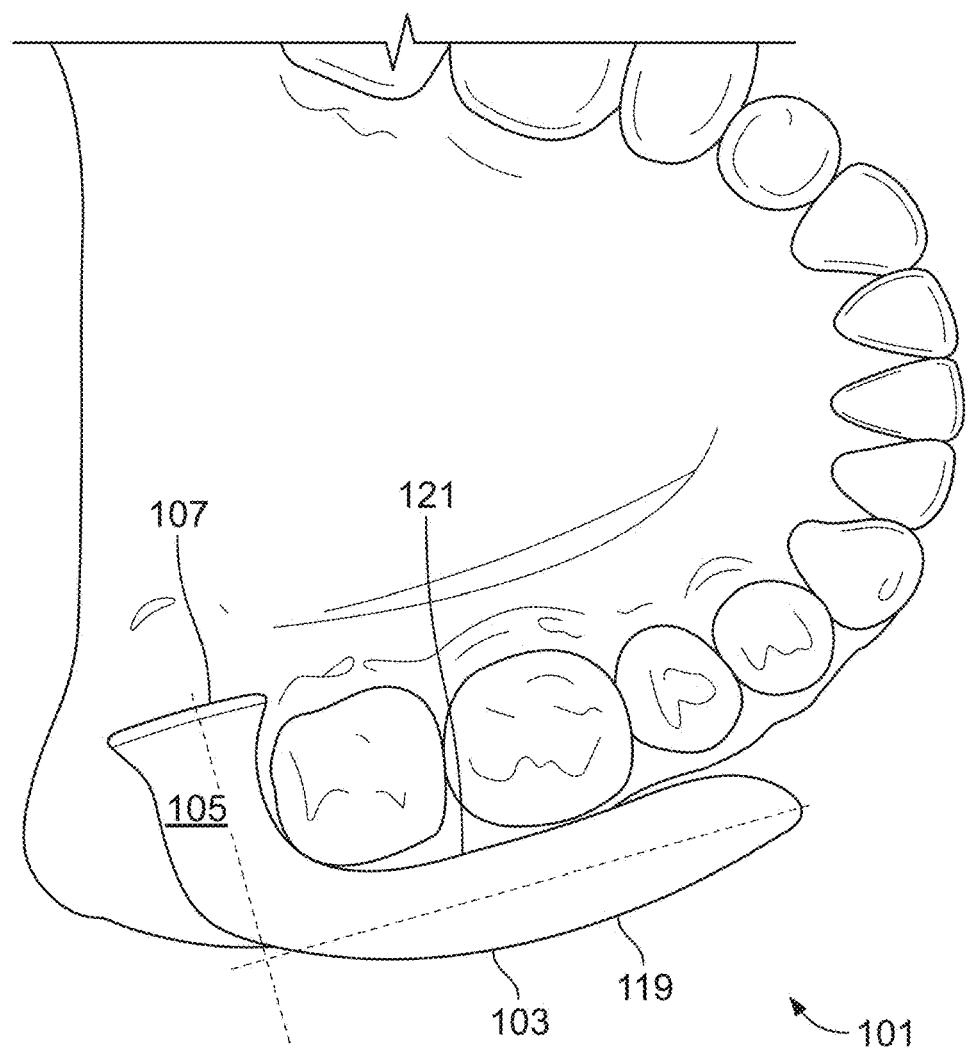
FIG. 4 depicts a top elevation view of an apparatus for treating bruxism according to the present disclosure in use by a patient.

Due to the smooth, rounded contours of the oral appliance (101), the distance between the buccal side (119) and lingual side (121) (the "thickness") is variable, but has a maximum extent, or maximum thickness, as shown in FIG. 4. Due to the high elasticity of the cheeks, achieving a snug fit for the thickness would be difficult, as the cheeks can stretch to accommodate a large volume. Thus, the thickness of the main body element (103) is generally selected to achieve a comfortable thickness fit that admits of some unintended movement when the cheeks are at rest, and does not significantly flex the cheeks, as prolonged exposure to such a force may result in soreness and, possibly, irreversible stretching of the skin of the cheeks, which could in turn lead to altered facial appearance.

By way of example and not limitation, in one embodiment, the maximum thickness between the buccal side (119) and lingual side (121) is about 6.0 mm. By way of example and not limitation, in another embodiment, the maximum thickness between the buccal side (119) and lingual side (121) is about 7.0 mm. The exact maximum thickness may vary from embodiment to embodiment, as the precise configuration of the oral cavity can be highly variable due to factors such as, but not necessarily limited to, the age, sex, and height of the wearer. Generally, multiple thicknesses will be available to accommodate users having differences in oral geometry, and differences in tolerance for wearing an oral appliance. Differing thicknesses may also be combined with differing heights. The depicted recess (109) may be used in an embodiment to reduce material usage and device weight and bulk, or to accommodate unusual oral geometry if necessary.

As shown in FIG. 4, when viewed from the top-down, the main contour of the oral appliance (101) is a roughly straight line from the distal end of the main body element (103) extending towards the treatment arm (105), but with a gradual curve inward towards the buccal side (119) beginning at or just beyond the midpoint of the oral appliance (101). This bend accelerates approaching the treatment arm (105), completing a right angle turn inward at the proximal end of the main body element (103). Simultaneously, the height of the main body element (103), as shown, decreases gradually approaching the treatment arm (105). Due to the smooth construction, as seen in the FIGURES, in the depicted embodiment, there is no discrete identifiable boundary between the main body element (103) and the treatment arm (105). Rather, the two elements transition smoothly from one to the other in the region of the oral appliance (101) at, or near, the bend. The term "transition zone" or "transition region" may be used to refer to this type of structure.

As shown in the depicted embodiments, the main body element (103) is rounded, with the buccal side (119) and lingual side (121) curving inward towards each other at the distal end of the main body element (103) to connect at a maximum distance from the treatment arm (105). In an embodiment, this is the same maximum distance as the maximum distance of the dorsal (113) and ventral (115) sides, but, in an alternative embodiment, it may be a different maximum distance. As shown in FIG. 2, this distance end of the main body element (103) may have a generally straight vertical profile, but other configurations are also possible.

The depicted main body element (103) comprises a treatment arm (105) at a first end, and an opposing end distal the arm, referred to herein as the distal end. In the depicted embodiment, the treatment arm (105) is a flange element relative to the main body element (103). The body of the main body element (103) extends lengthwise between the treatment arm (105) and distal end. As described elsewhere herein, the main body element (103) has smooth, rounded transitions to other structures to avoid producing edges or points. As described elsewhere herein, when in use, the treatment arm (105) is disposed posterior of maxillary tuberosity, and the distal side is disposed towards the front or opening of the oral cavity.

Due to the smooth, rounded contours of the oral appliance (101), the distance between the treatment arm (105) and the distal side (the "depth") is variable, but has a maximum extent, or maximum depth, as shown in FIG. 2. When the oral appliance (101) is properly disposed within a typical human oral cavity as described herein, the main body element (103) will be disposed entirely, or almost entirely, within the space within the oral cavity defined by the adjacent maxillary and mandibular buccal vestibules. The location of the treatment arm (105) during use is described elsewhere herein.

By way of example and not limitation, in one embodiment, the maximum depth is about 41.0 mm. In another embodiment, the maximum depth is between about 41.0 mm and about 48.0 mm. The exact maximum depth may vary from embodiment to embodiment, as the precise configuration of the oral cavity can be highly variable due to factors such as, but not necessarily limited to, the age, sex, and height of the wearer. Generally, multiple depths will be available to accommodate users having differences in oral geometry, and differences in tolerance for wearing an oral appliance. Differing depths may also be combined with differing thicknesses and heights.

As shown in the depicted embodiments, the lengthside contours of the dorsal side (113) and ventral side (115) may not be symmetric. This may be due, for example, to differences in the maxillary and mandibular structures of the oral cavity. As seen in the FIGURES, the dorsal side (113) will generally have a straighter contour that blends gradually at the bend into the treatment arm (105), but the ventral side (115) may have a more pronounced, but gradual curve, generally following the shape of the adjacent mandibular structures.

The depicted oral appliance (101) comprises a treatment arm (105) connecting the main body element (103) to a knob element (107). The depicted knob element (107) is disposed at the far end of the treatment arm (105) distal the main body element (103), which will be referred to herein as the "anchor end" to avoid confusion with the distal end of the main body element (103). The depicted knob element (107) is generally in a roughly triangular configuration, but with curved sides and rounded edges, roughly resembling a guitar pick. This may be a Reuleaux triangle, a curvilinear triangle, or another form of regular or irregular rounded triangle. In an embodiment, the cross-sectional configuration of the knob is an irregular curvilinear polygonal shape. In an embodiment, this shape has a maximum height of about 12 mm in a first direction, and a maximum width of about 9 mm in a second direction, where the second direction is generally perpendicular to the first direction.

Figure 5:
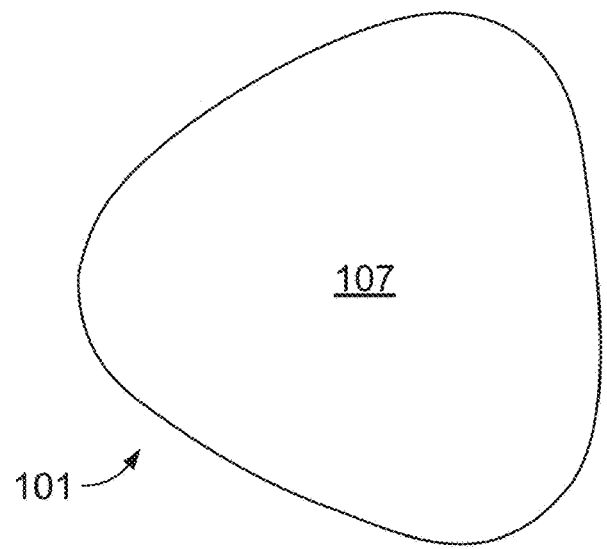
FIG. 5 depicts a side elevation view of the knob end of an apparatus for treating bruxism according to the present disclosure.
Figure 7:
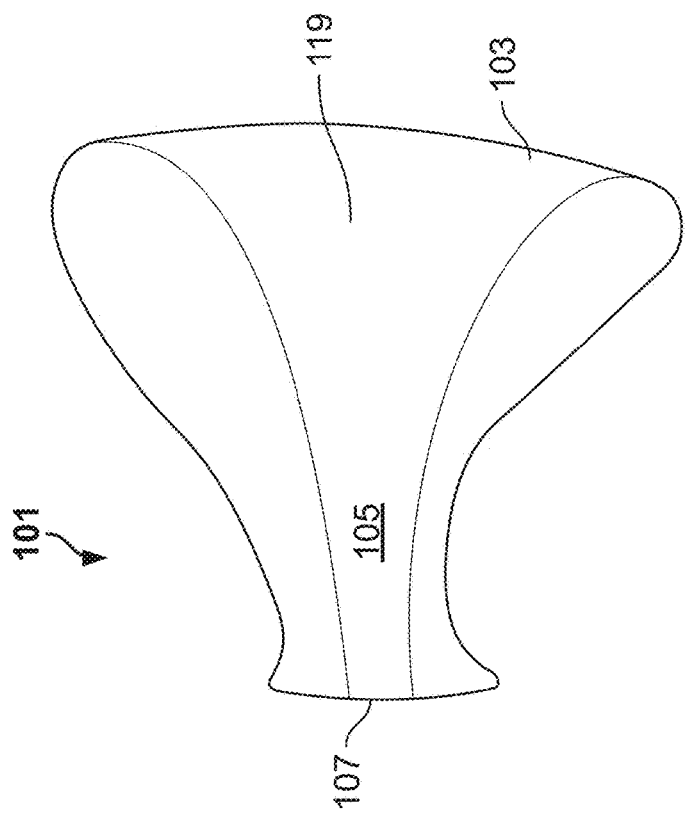
FIG. 7 depicts a side elevation view of an apparatus for treating bruxism according to the present disclosure.
Figure 6:
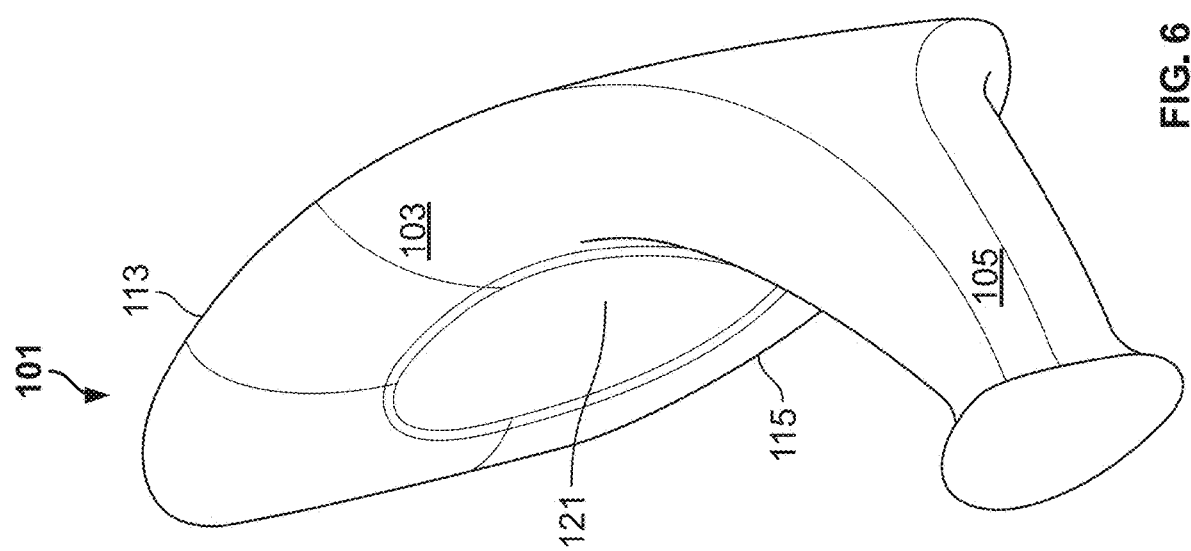
FIG. 6 depicts an isometric elevation view of an apparatus for treating bruxism according to the present disclosure.
Figure 8:
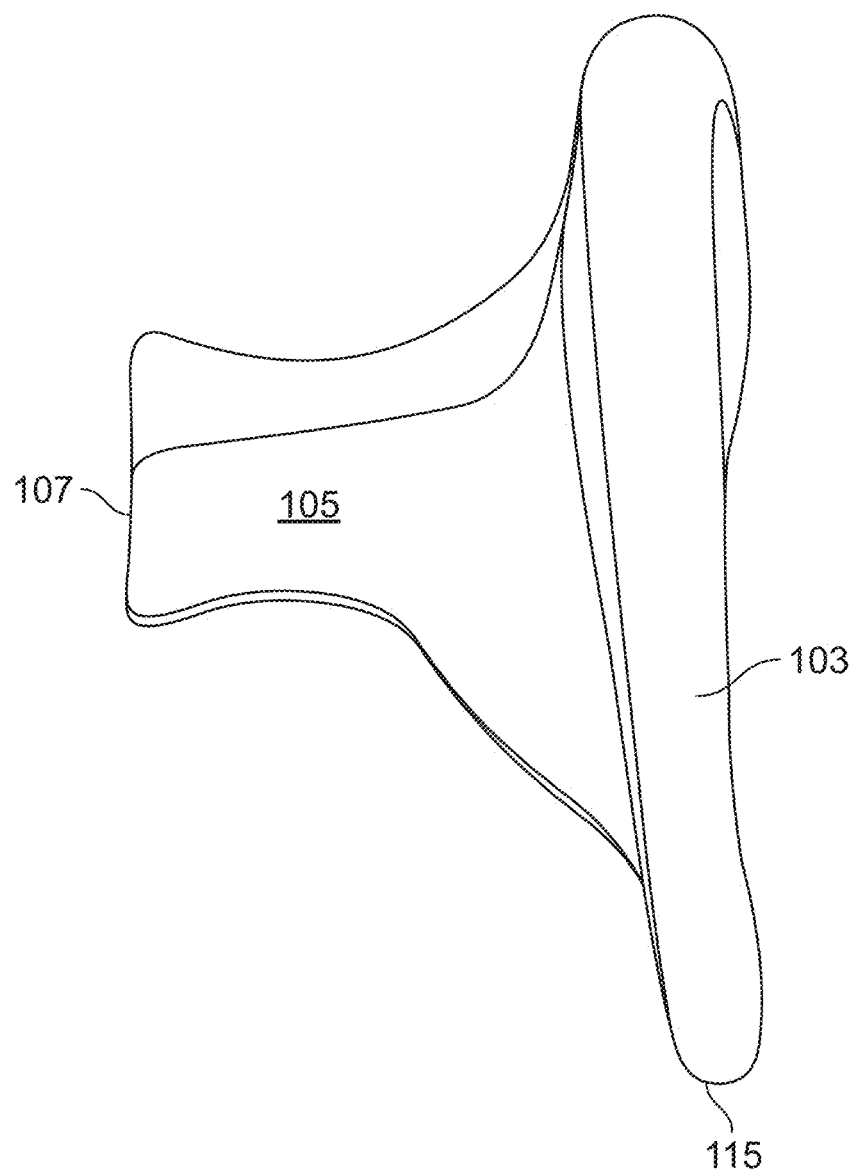
FIG. 8 depicts a perspective view of an alternative embodiment of an apparatus for treating bruxism according to the present disclosure.
Figure 9:
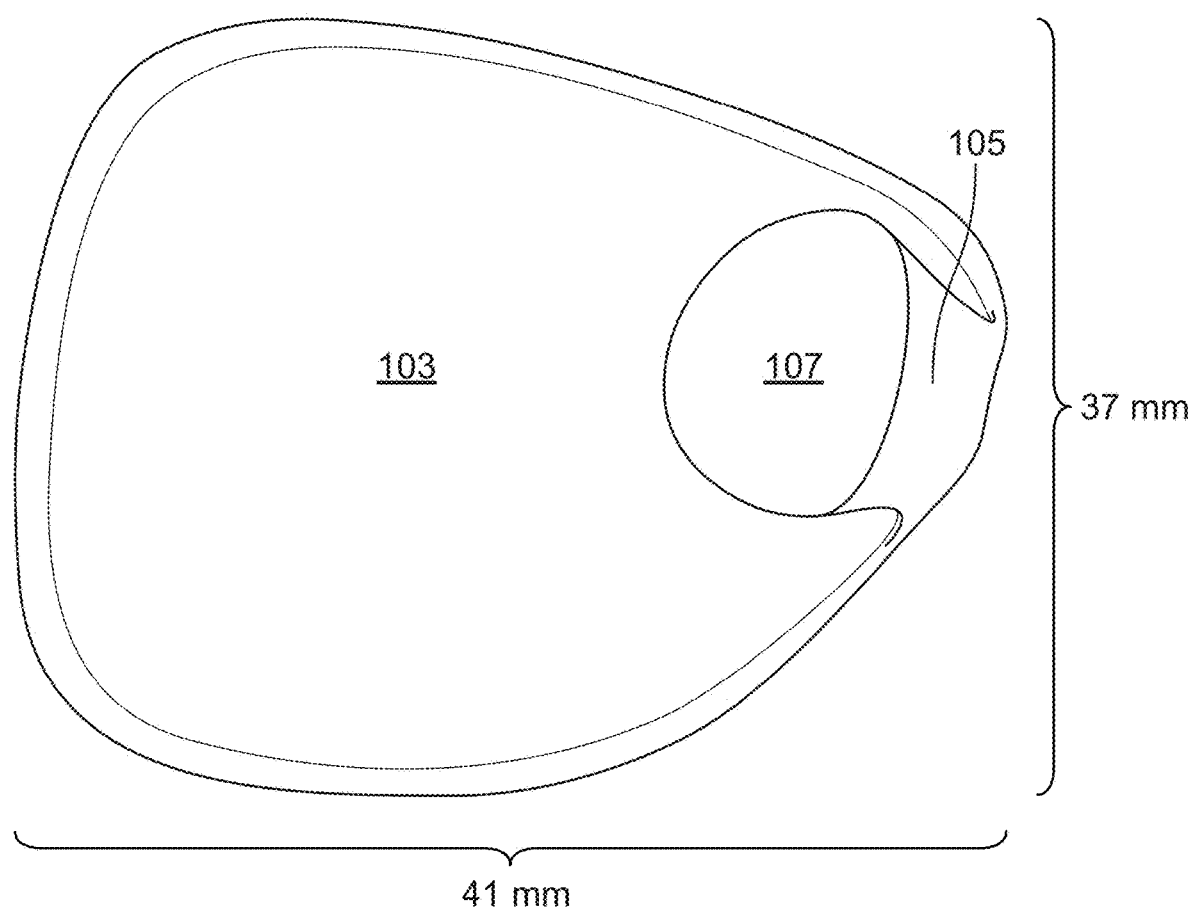
FIGS. 9-19 depict various perspective views of the embodiment of FIG. 8.
Figure 10:
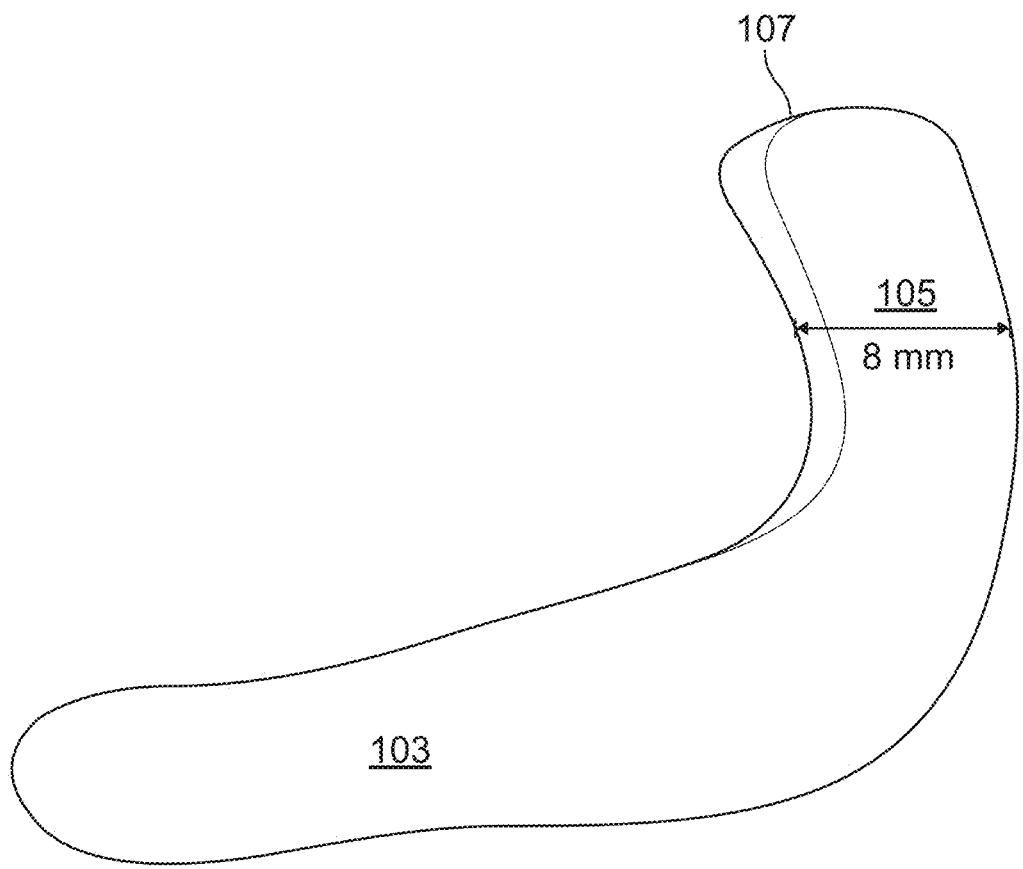
Figure 11:
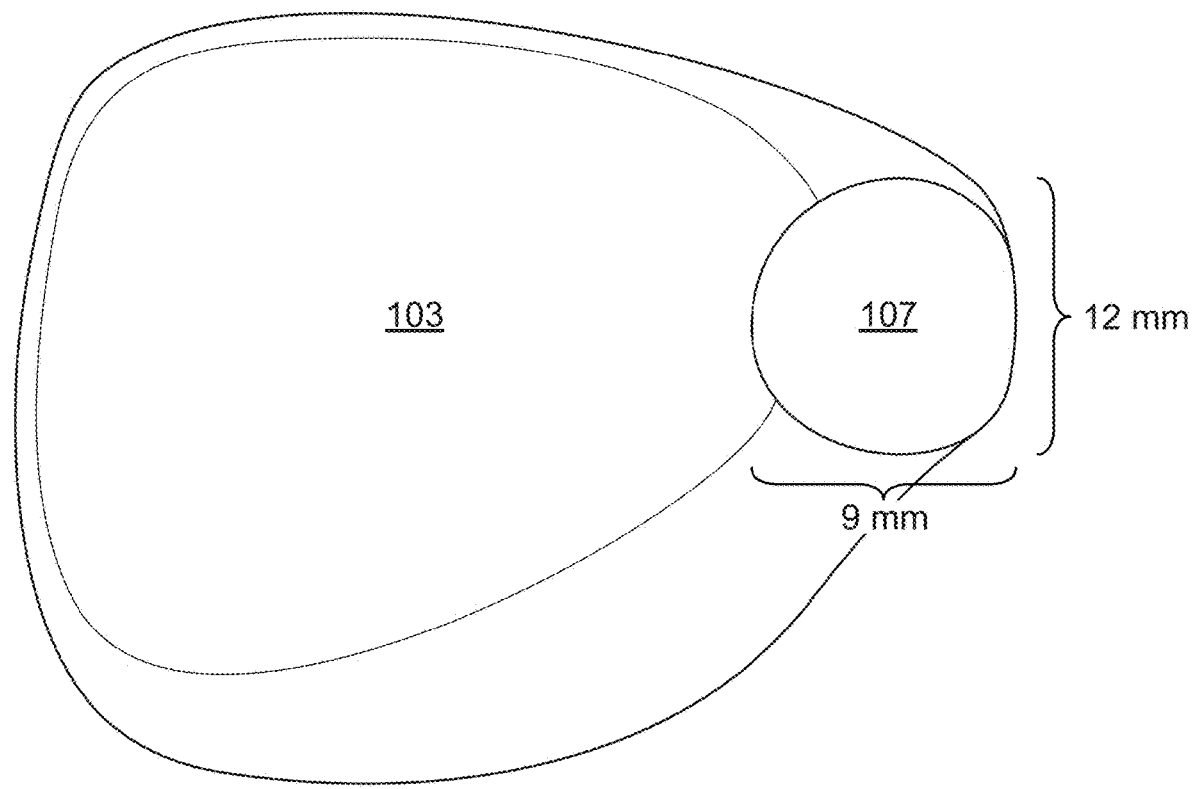
Figure 12:
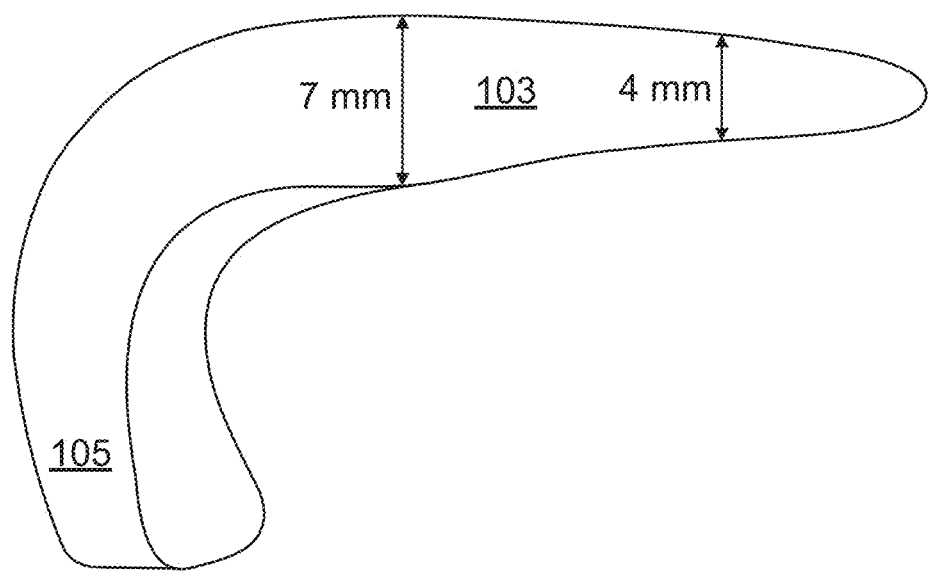
Figure 13:
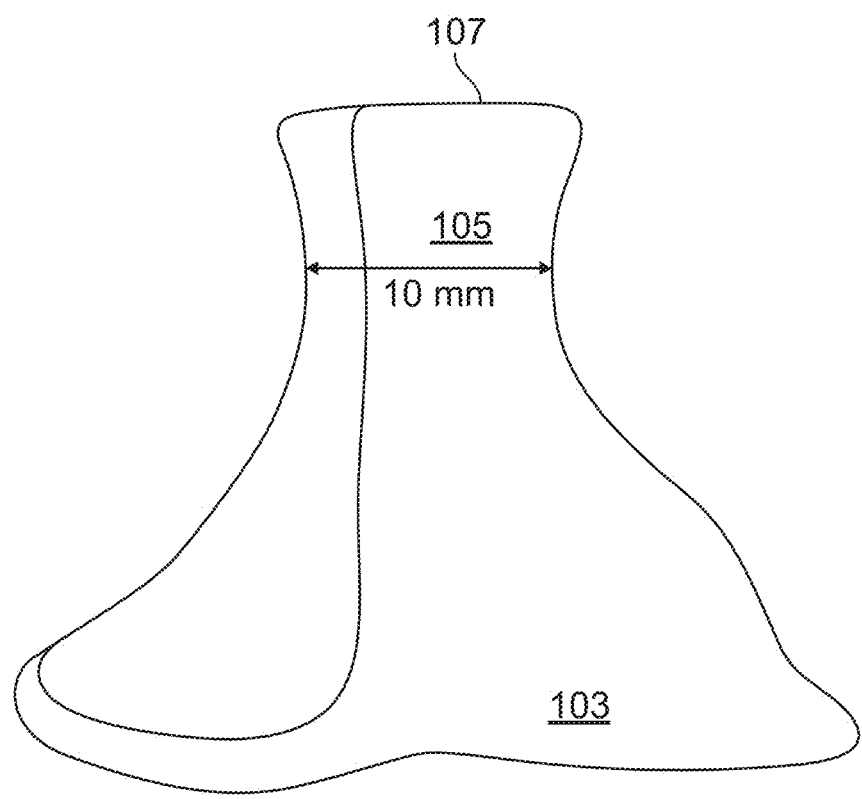
Figure 14:
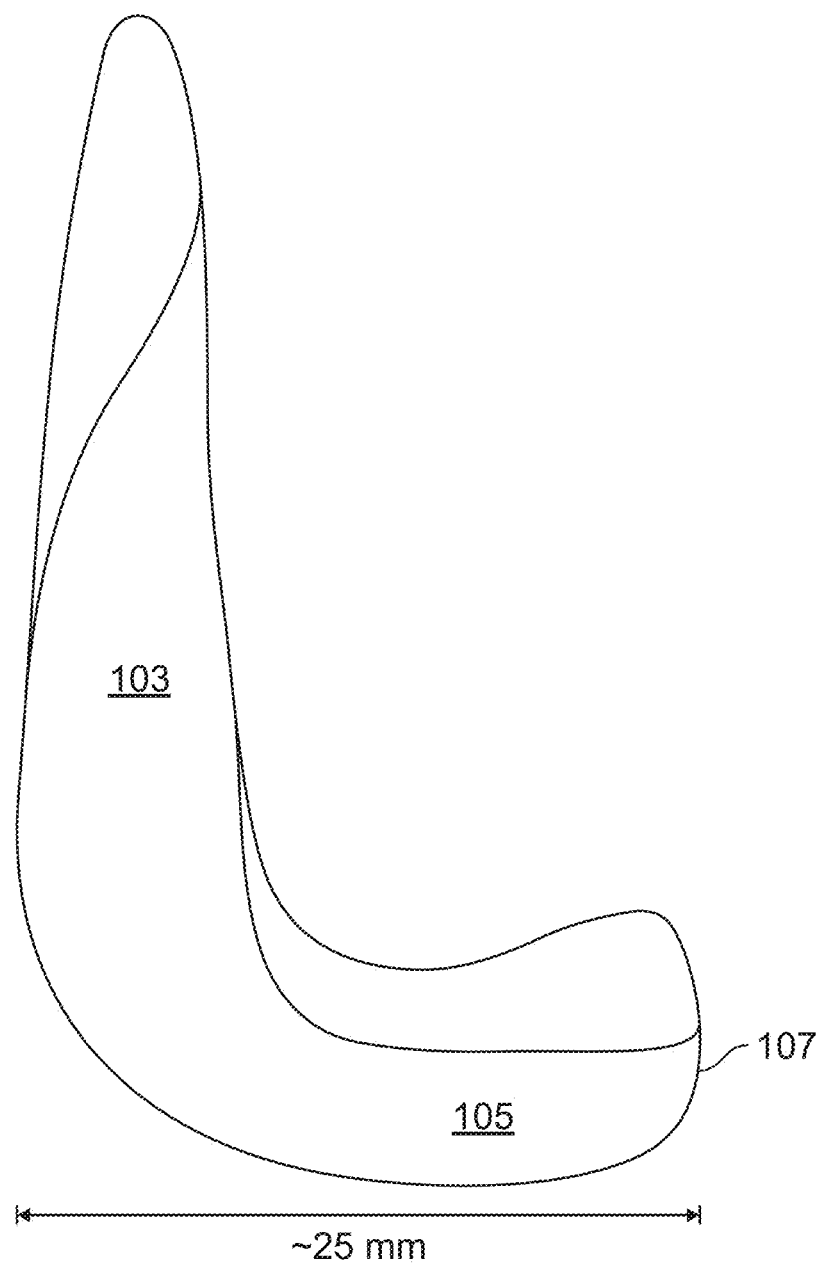
Figure 15:
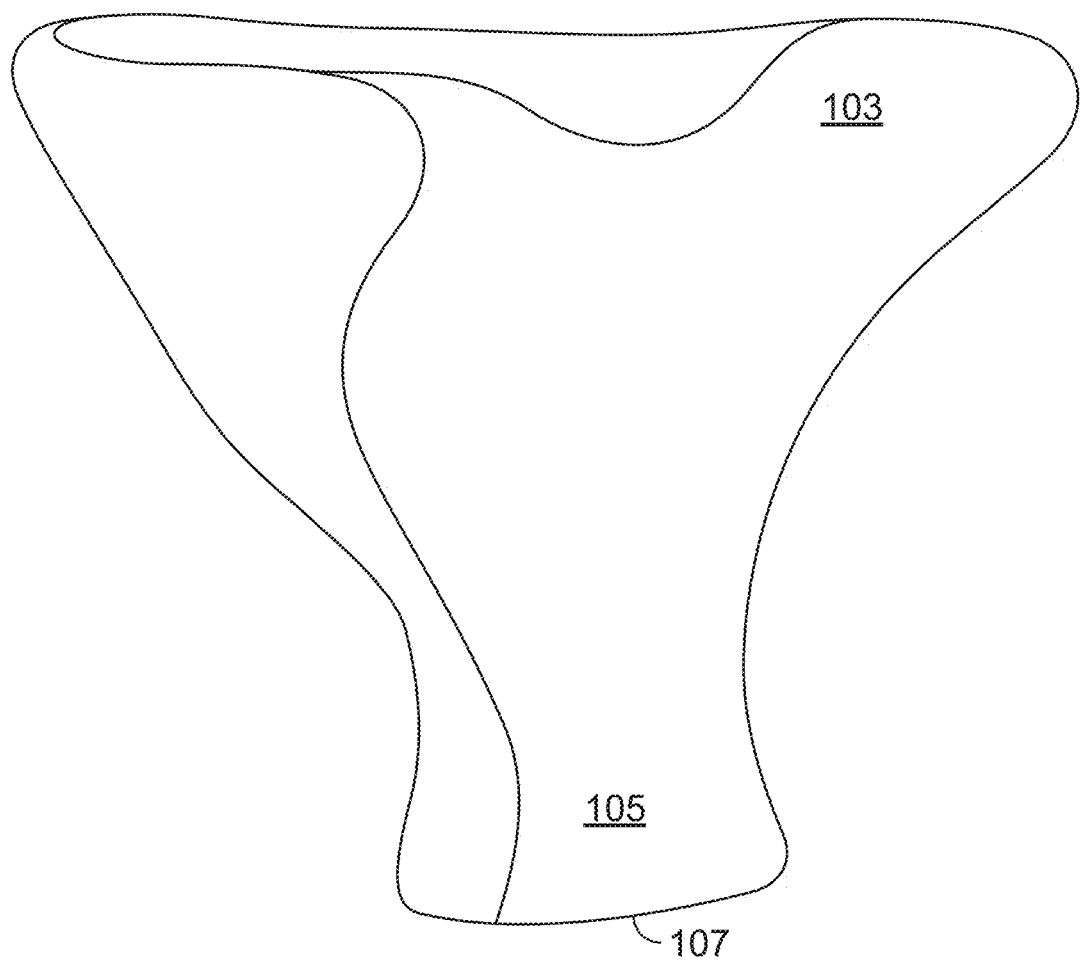
Figure 16:
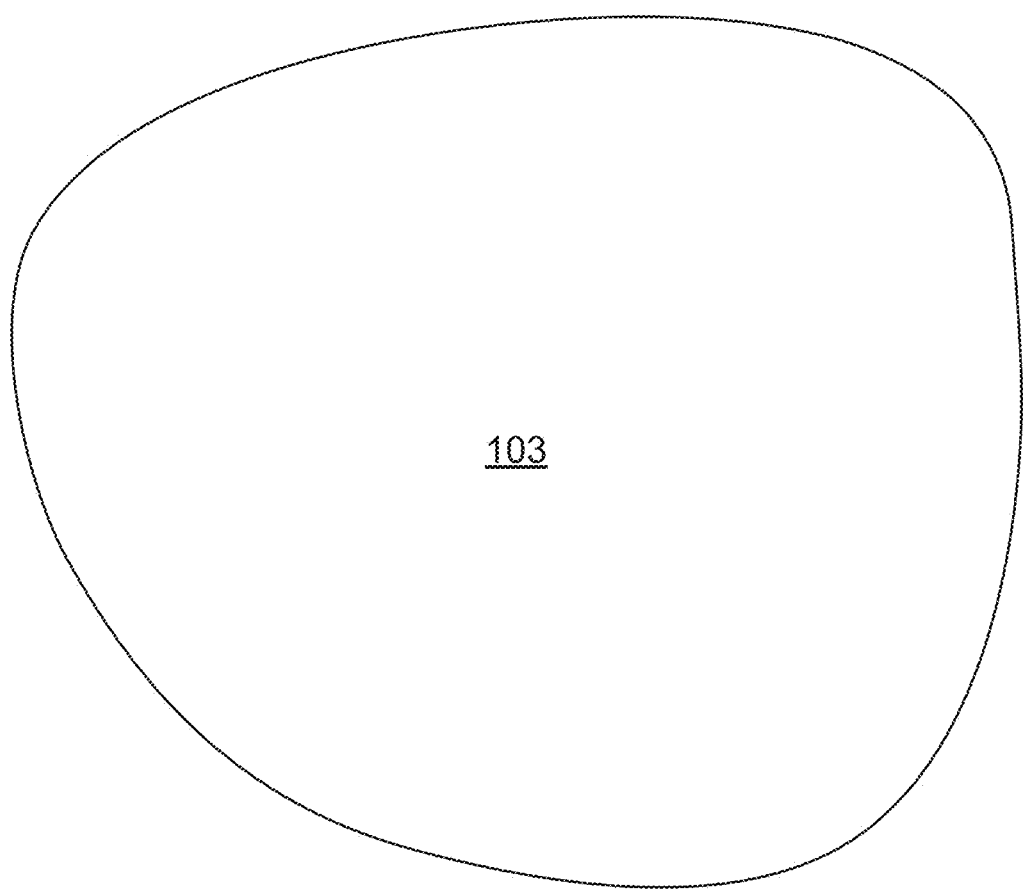
Figure 17:
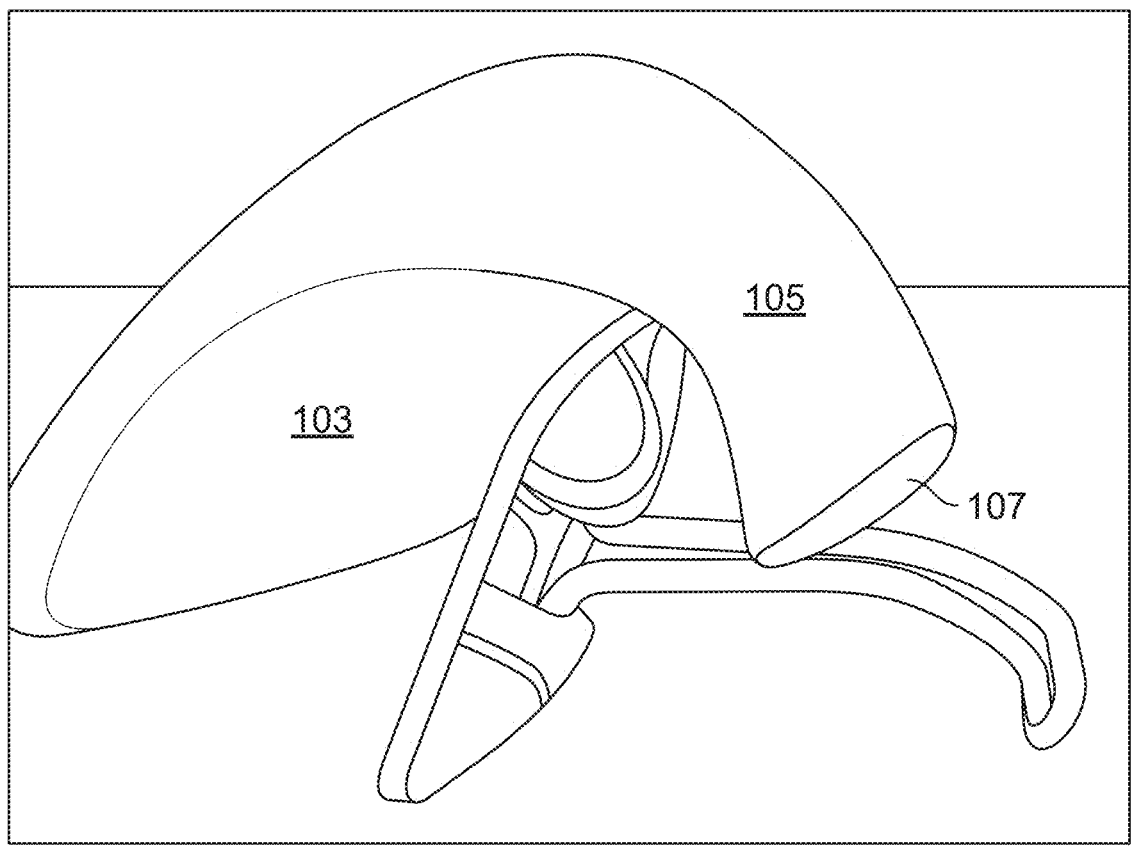
Figure 18:
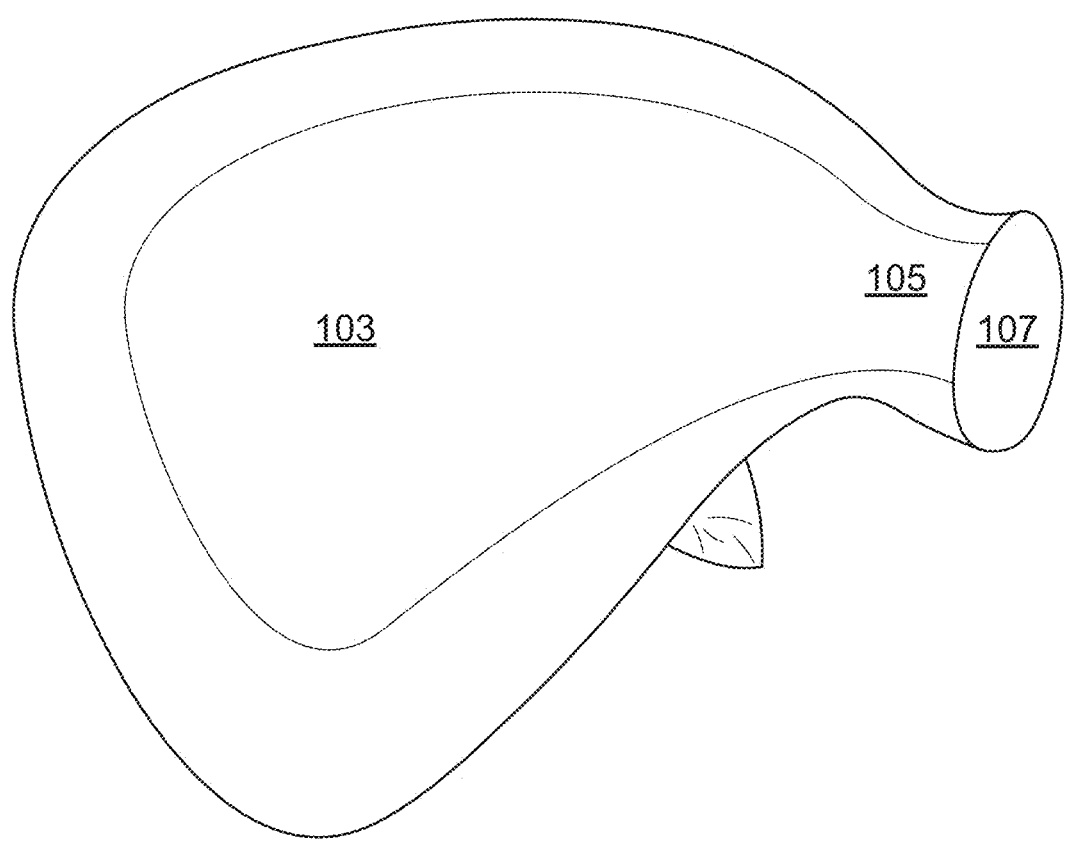
Figure 19:
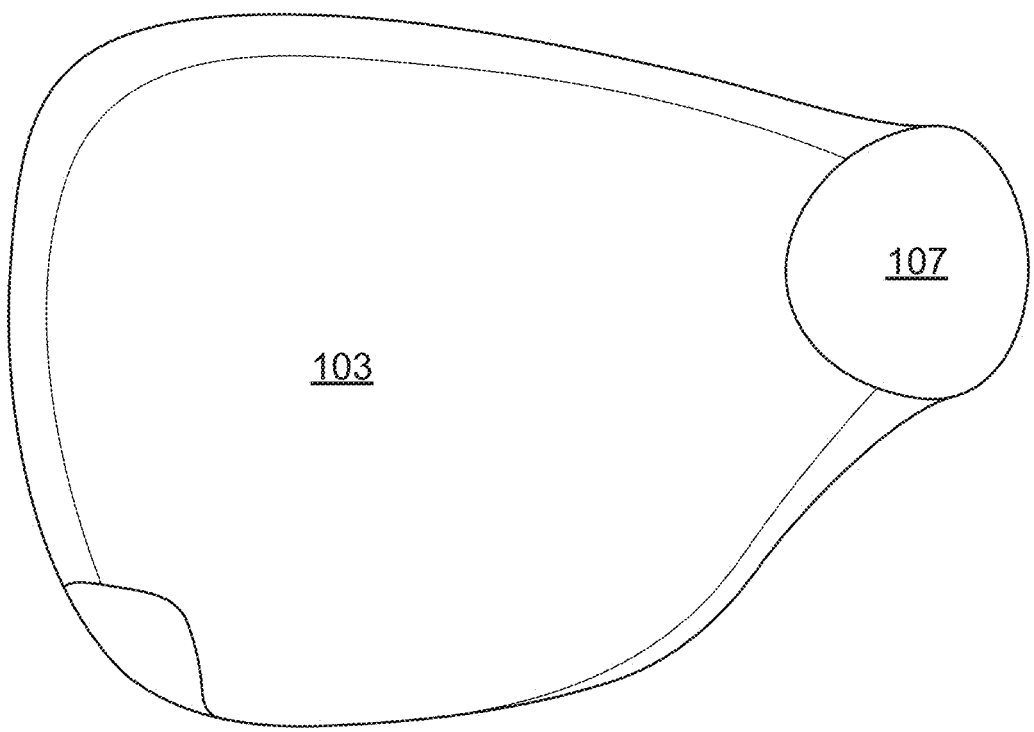

The treatment arm (105) is a relatively narrow, elongated element extended generally perpendicularly from an end of the main body element (103), and effecting a smooth transition from the shape of the main body element (103) to that cross-sectional shape of the knob element (107), which is shown in FIG. 5. That is, the buccal side (119) curves gradually approaching the treatment arm (105), accelerating to a rapid but still rounded right angle, and narrowing to form the rounded back of the treatment arm (105), and then terminating at the back side of the knob element (107). The lingual side (121), by contrast, is separated into top and bottom segments by the recess (109). Those top and bottom segments also narrow and curve inwardly approaching the treatment arm (105), and then connect at the treatment arm (105) to transition into and form the other two sides of the treatment arm (105), again terminating in the remaining two sides of the knob element (107).

As can be seen in the FIGURES, the cross-sectional size of the knob element (107) is larger than that of the treatment arm (105) immediately adjacent to the knob element (107). That is, the dimensions of the oral appliance (101) narrow from the midpoint of the main body element (103) to the treatment arm (105), and continue to narrow along the length of the treatment arm (105), but then expand against at the terminus of the treatment arm (105) of the knob element (107), giving the outer perimeter of the knob element (107) the appearance of a lip or ridge. In the depicted embodiment, the minimum cross-sectional width of the treatment arm (105) when viewed dorsally is about 8.0 mm, but this may vary to accommodate different oral geometry. In an embodiment, the minimal cross-sectional width of the treatment arm (105) when viewed from the front of the apparatus is about 10 mm, but this again may vary to accommodate different oral geometry. In an embodiment, the maximum distance between the distal end of the knob element (107) to the buccal side of the main body element (103) may be about 25 mm. This also this may vary to accommodate different oral geometry.

Figure 20:
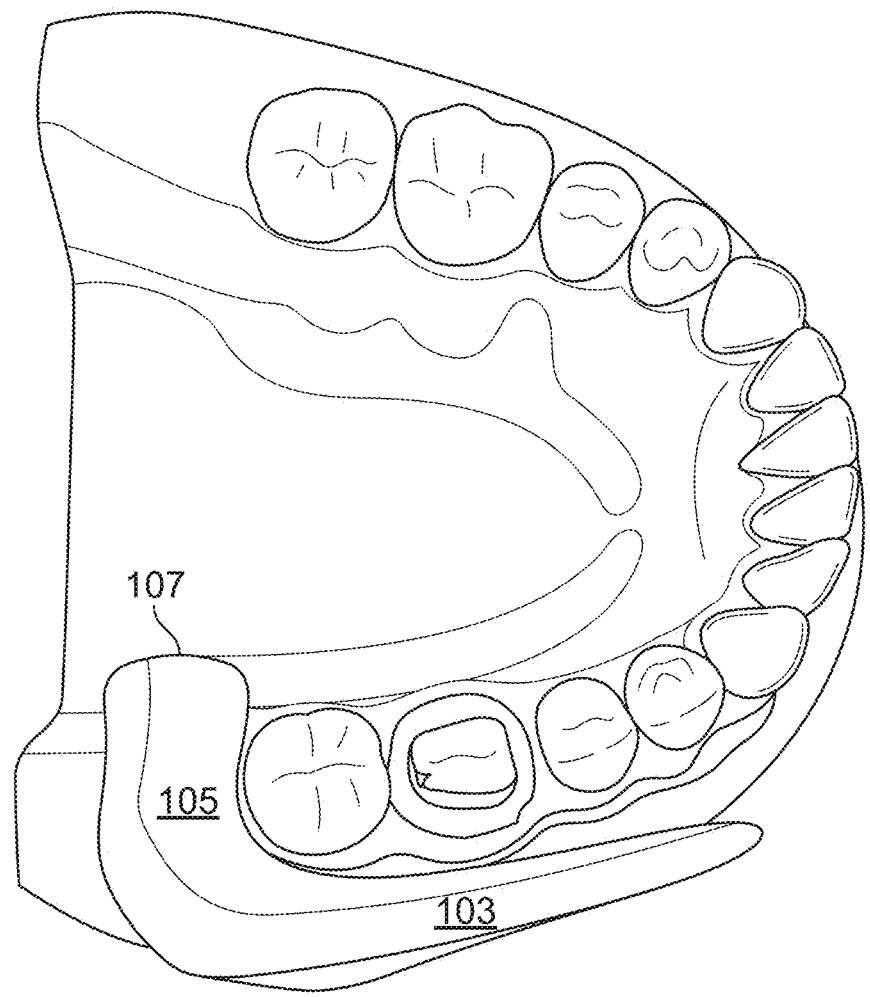
FIGS. 20-21 depict the embodiment of FIG. 8 in use.
Figure 21:
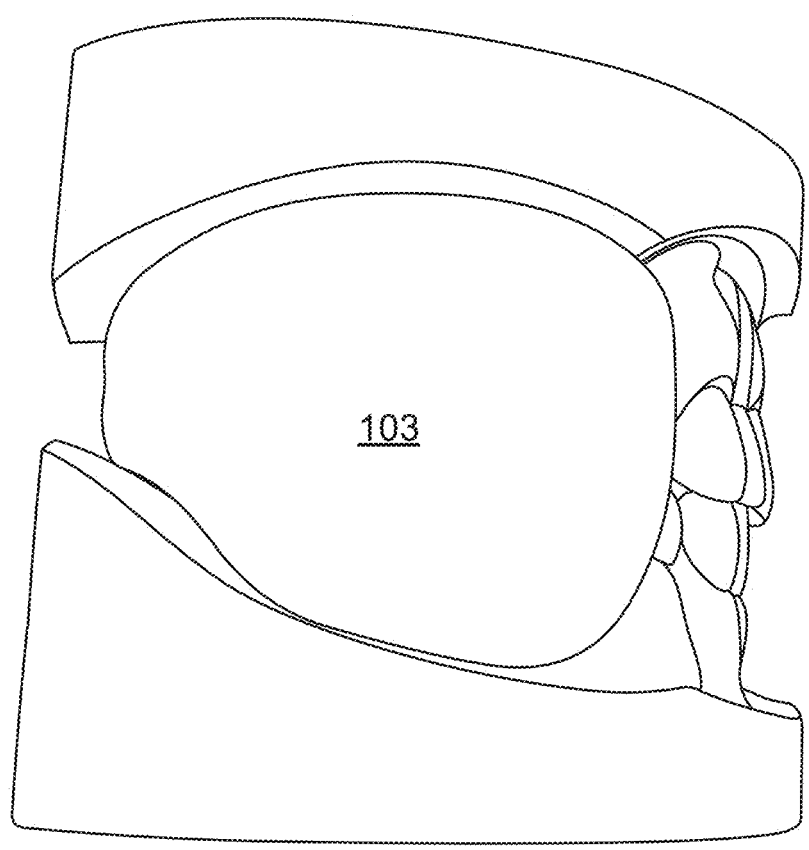

FIGS. 20 and 21 depict an embodiment in use. Generally, the oral appliance (101) is used by positioning the treatment arm (105) among the soft tissue behind the molars. The oral appliance (101) can be comfortably situated in this part of the mouth. The primary function of the main body element (103) is to secure the oral appliance (101) in place and minimize swallowing and choking risk. The therapeutic aspects of the oral appliance (101) are primarily delivered by the treatment arm (105), which is sized, shaped, and dimensioned so that when it is properly positioned, it can be comfortably held in the mouth and does not damage adjacent tissue, but the mouth is discouraged from being closed such that teeth make contact. Generally, this is done by the treatment arm (105) being sized, shaped, and dimensioned so that, when biting down on the positioned oral appliance (101) with increasing bite force, the pressure between the treatment arm (105) and adjacent oral structures reaches a point of intolerable discomfort when the distance between the upper and lower teeth reach a particular range or threshold. For purposes of this disclosure, "intolerable discomfort" will be understood as meaning discomfort tending to generate in the patient an immediate desire to relieve the pressure by relaxing the bite. In an embodiment, this range may be 2 mm to 3 mm. In another embodiment, the range may be less than about 3 mm, less than about 2.5 mm, less than about 2.0 mm, less than about 1.5 mm, or less than about 1.0 mm.

A number of techniques may be used to prepare the oral appliance (101) for use. First, the patient may bite down on a measuring stick on the front teeth to familiarize the patient with the ideal spacing (e.g., the threshold distance/range, such as 2.5 mm). For people with no front teeth, use of a classic toothpick diameter to bite down on for measurement in between any back teeth that bite together (are in occlusion) may be sufficient. The following disclosure assumes a right-handed patient, but the instructions may be reversed for a left-handed patient. It should be noted that the oral appliance (101) is believed to function adequately with only one installed in the oral cavity, though a patient could use two.

Next, the patient may sample various sizes or configurations of the oral appliance (101) to identify and select a configuration that allows the patient to close the mouth closest to the opening of the measuring stick. If two are about the same distance apart, it may be helpful to choose the smaller size to try using first. To insert, the patient holds the oral appliance (101) with the patient's hand with the treatment arm (105) facing towards the patient, and the buccal side (119) towards the patient's cheek. This will be inserted on the left side. The patient then opens wide enough that the treatment arm (105) slides past the occlusal surfaces of the patient's teeth, with the buccal side (119) sliding alongside the patient's cheek. Once the oral appliance (101) is as far back as it will go comfortably, with the patient's thumb and index finger still holding the front, the patient starts to close down as the oral appliance (101) slips comfortably into the soft tissue area behind the patient's molars.

The patient should close down slowly and carefully, then measure the distance between the patient's front top and bottom teeth when starting to feel pressure on the treatment arm (105). The patient may use experimentation and trial and error to determine which size and configuration achieves the most comfortable fit closest to the preferred distance measure (e.g., 2.5 mm).

The device may be worn during slumber. Before bed, the patient may perform his or her usual oral hygiene routine and, before slumber, insert the oral appliance (101), which should be clean. The appliance can be worn throughout sleep and removed in the morning and cleaned. The patient may remove by using the hand to grab the most anterior aspect and opening the mouth. The process of opening wider naturally displaces the product. The patient should discontinue use or select another configuration if unusual discomfort occurs during normal and proper use, or if the patient observes tissue trauma or experiences unusual symptoms during or after use.

The appliance may be manufactured from any material known to be suitable for use in the oral cavity and should be cleaned at least once or twice weekly using toothbrush or oral appliance brush, and soap. For preferred cleaning, the oral appliance (101) should be soaked daily in water and oral appliance cleaning tabs. When not in use, the oral appliance (101) should be stored in a sanitary case. The device may be manufactured for use in either the left or right side of the mouth. If no standard configuration provides the patient with a reasonable fit, the patient may use a customization embodiment. Customization fits may be achieved using any technique known in the art, including but not necessarily limited to three-dimensional scanners, boil-and-bite technologies, and impression materials.

Regarding fit and feel, when wearing the oral appliance (101) at rest, there should preferably be no sharp areas of pain or discomfort. When at rest, a majority of pressure felt should be in the back, near the treatment arm (105). Less pressure should be felt near the knob element (107), and the least in the main body element (103). About equal pressure should be felt both at the dorsal and ventral edge of the main body element (103). Cheeks should not feel overfull.

With increasing pressure, the oral appliance (101) should stay in place and not slip out of the retromolar space. When biting down, with increasing force, the pressure should either stay the same or not be noticeably increased in the main body element (103) compared with the treatment arm (105). With increasing force, only increasing pressure in the treatment arm (105) and knob element (107) should be felt, and should be less and less comfortable. With increasing force, the oral appliance (101) should not "tip" towards the top or bottom in the mouth, or should tip only minimally, and to a degree that does not dislodge the treatment arm (105) from an effective treatment position.

With increasing pressure, the oral appliance (101) should depress or "squish"; there should be some give to more evenly distribute loads within the retromolar space on the treatment arm (105) and knob element (107). Most ideally, intolerable discomfort should occur just before or at the position where existing teeth touch. The amount of contraction or compression that the oral appliance (101) will accept before resisting further compression may be a function of the size of the device, and the size of the air pocket into which it will fit. A larger device may admit of more compression than a smaller device, with the additional cushion providing increased comfort.

When asleep, increasing discomfort in the retromolar space with increasing biting force discourages further loading, even when the patient is not awake. This is one difference between the oral appliance (101) and prior designs for bruxism, which do not aim to discourage the action of grinding itself. Ideally, over time, continual reinforcement of discomfort associated with bruxism retrains the patient to minimize or discontinue grinding through habituation.

The oral appliance (101), when comfortably inserted, should clear both the maxillary and mandibular buccal frenums. Starting ventrally, the main body element (103) should fit entirely or almost entirely, and largely passively, within the buccal vestibule. As it progresses posteriorly, appropriate pressure may commence along the buccal shelf, as the edge widens. The device's curve in the main body element (103) ventrally should not extend past the external oblique ridge. Going further back, the widening edge approximates the mandibular anatomy from the buccal shelf as it ascends and then has its most superior point the furthest back in the treatment arm (105). Here, it progresses from the buccal shelf to the retromolar pad. The oral appliance (101) should fit ventrally in the functional area in the retromolar area, behind the mandibular molar teeth, and should not extend past the first half to two-thirds of the retromolar pad in the back.

The ventral edge of the knob element (107), continuing from the treatment arm (105), preferably should slope medially towards the lingual sulcus and mylohyoid fossa. It preferably should extend just far enough to ensure retention when loaded, but the most extended edge of the lower knob element (107) should not be primarily loaded further medially than the retromolar pad, on the lingual vestibule. It preferably should not extend more than 2-3 mm deep into the lingual vestibule. At its medial edge, the oral appliance (101) preferably should not protrude more than 2-3 mm past the existing teeth or margin of the lingual cortical plate, thus should not significantly interfere with or be uncomfortable next to the tongue. In general, the posterior aspect should sit anterior to pterygomandibular raphe and the retromylohyoid curtain, and should not place significant pressure on any posterior, buccal, or lingual soft tissue.

Beginning with the dorsal edge of the oral appliance (101) from the front, as with the ventral edge, the main body element (103) should fit entirely or almost entirely and largely passively, within the buccal vestibule. As it extends posteriorly, the contour approximates a curve from the buccal vestibule medially when passing past the maxillary tuberosity. Minimal loading is ideal until the slope is on the posterior aspect of the maxillary tuberosity, approaching the hamular notch. As it flows posteriorly, the dorsal edge appliance also slopes downward and widens, approximating the anatomy of the maxillary tuberosity as it is sloping upwards. The knob element (107) slopes onto the hard palate and preferably should not extend more than 2-3 mm into the area of the soft palate.

The upwards slope of the posterior aspect of the maxillary tuberosity is used for retention. As pressure increases, the ventral aspect of the oral appliance (101) may even push posteriorly further towards the retromolar pad, but the arch contour in that area inhibits the oral appliance (101) from dislodging buccally. The majority of the dorsal treatment arm (105) and knob element (107) should preferably end nearing the hamular notch, but not overly extending into it.

As referenced, although the anatomy is dense in this region, the oral appliance (101) is configured to rest within vacant regions and through proper fit avoid most of it, except as described herein.

Generally, the oral appliance (101) is used by positioning the treatment arm (105) among the soft tissue behind the molars. The oral appliance (101) can be comfortably situated in this part of the mouth, but the treatment arm (105) is sized and shaped so that the mouth cannot be fully closed. In the preferred embodiment, the treatment arm (105) is sized and shaped so that, when biting down on the positioned oral appliance (101) with increasing bite force, the pressure between the treatment arm (105) and adjacent oral structures reaches a point of intolerable discomfort (tending to cause the patient to desire to promptly relieve the pressure by relaxing the bite) once the distance between the patient's teeth is less than about 2 mm to 3 mm, referred to herein as the "stasis distance." When the jaw is so positioned, it may be referred to as being in a passive position, resting position, or stasis position. In an embodiment, the statis distance may be less than about 3 mm, less than about 2.5 mm, less than about 2.0 mm, or less than about 1.5 mm. All references to "mm" herein should be understood as millimeters.

Some embodiments may be premanufactured in predetermined sizes and shapes and shapes, but use of the device could also be prescribed and/or customized. This may be done by taking an impression of or other capturing data regarding the size, shape, and structure of the oral anatomy in the regions where the device will be worn. This may be done using impression materials, scanning technology, and the like. This data and/or impression may then be sent to a fabrication laboratory, where a model of the patient anatomy can be created. This model may then be used to fabricate an apparatus according to the present disclosure, with particular dimensions and variations and accommodate the specific anatomy of the patient. The apparatus may then be returned to the prescribing healthcare professional, checked for fit on the patient, and adjustments and refinements may be appropriate to ensure proper fit and effectiveness.

Figure 22:
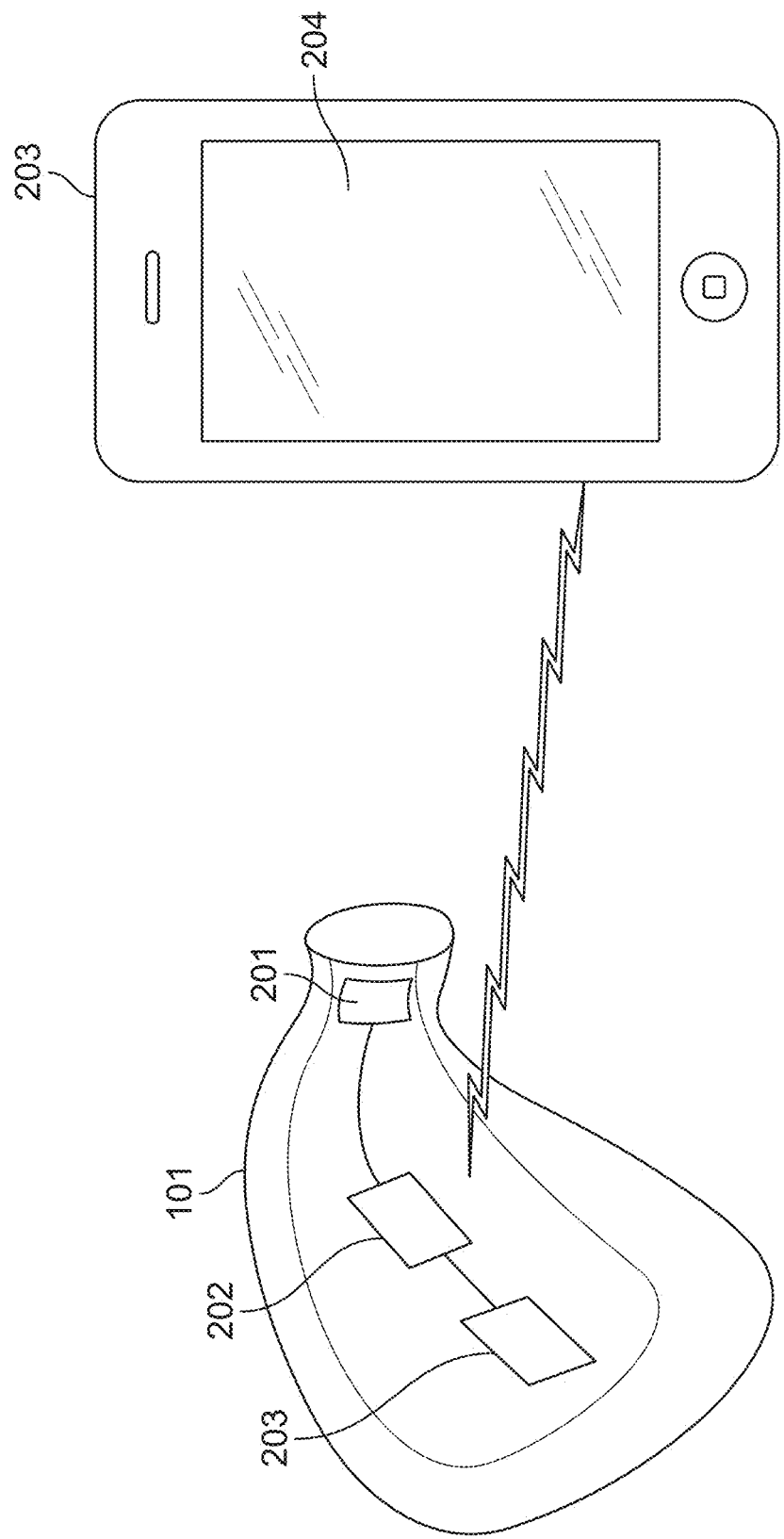
FIG. 22 depicts an embodiment of an apparatus for treating bruxism according to the present disclosure in use with a mobile application.

In an embodiment, the apparatus (101) may include one or more sensors (201) to capture data that may be useful or usable in assessing treatment effectiveness, conducting product research, and providing feedback to the patient. One such embodiment is depicted in FIG. 22. By way of example and not limitation, one or more pressure sensors (201) could be embedded or otherwise included in the functional arm. Such sensors (201) could detect when the patient bites or attempts bite down, and record information such as the date and time, amount of pressure, duration of bite, frequency of bite attempts, and so forth. This information could also be transmitted via a wireless protocol to a receiving device (203) for storage, retrieval, and analysis. This may done by further including a wireless transmitter (202), such as a short-range radio transmitted (e.g., BlueTooth™), or a wireless networking transmitter (e.g., WiFi™) or another appropriate protocol. In an embodiment, the Internet may be used for data exchange. The receiving device (203) may in turn be a mobile phone or other computer equipped to receive such signals, and which may be programmed with application software (204) for analyzing, sharing, and/or displaying such data. This software (204) may be designed for use by the patient, who can then track the treatment and progress, and/or may be received or shared with the treating health care professional via a separate receiving device. Data from multiple patients may be accumulated to provide community-based health information, and used to improve future iterations of the apparatus. It will be understood that additional hardware (203) may also be present enable this system, such as, but not necessarily limited to, a controller, a storage, and related circuitry.

Other sensors may also or alternatively be included to collect data that could be relevant to overall oral and dental health, such as, without limitation, sensors to monitor salivary flow, moisture levels in the mouth, pH, noise (e.g., abnormal breathing, snoring, or other signs of sleep apnea or other sleep disturbances), temperature, barometer, light, orientation and movement (e.g., an accelerometer and/or gyroscope), and so forth. The application software may provide for logging other aspects of treatment, such as: jaw pain and/or discomfort; wear patterns on the apparatus (e.g., the patient could take photographs of the device each morning, and the treating health care professional may assess the wear patterns over time, and/or an AI model could be trained to assess and suggest diagnoses or other implications of the wear patterns); overall sleep quality, such as frequency and duration of disturbances; occurrence of headaches or migraines; and treatment compliance (how consistently does the patient use the apparatus).

It should be noted that this disclosure generally contemplates an adult patient, but the apparatus and method described herein may be suitable for pediatric use as well, it being recognized that the size, shape, and relative proportions of the anatomical structures in the oral cavity change as a human ages, and different sizing may be appropriate for pediatric use.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Throughout this disclosure, the term "software" (and other, similar terms, such as "program") refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory. Program code embodied on a computer readable medium may be transmitted using any appropriate medium, including but not limited to wireless, wireline, optical fiber cable, RF, etc., or any suitable combination of the foregoing.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

For purposes of this disclosure, there will also be significant discussion of a special type of computer referred to as a "mobile communication device" or simply "mobile device". A mobile communication device may be, but is not limited to, a smart phone, tablet PC, e-reader, satellite navigation system ("SatNav"), fitness device (e.g. a Fitbit™ or Jawbone™) or any other type of mobile computer whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in near-constant real-time communication with a network.

Throughout this disclosure, geometric terms may be used to characterize, among other things, sizes, shapes, dimensions, angles, distances, and relationships. These terms may be used with qualifiers such as "generally," "about," and "approximately." One of ordinary skill in the art will understand that, in the context of this disclosure, these terms are used to describe a recognizable attempt to conform a device or component to the qualified term. By way of example and not limitation, components described as being "generally coplanar" will be recognized by one of ordinary skill in the art to not be actually coplanar in a strict geometric sense because a "plane" is a purely geometric construct that does not actually exist and no component is truly "planer," nor are two components ever truly coplanar. Variations from geometric descriptions are unavoidable due to, among other things, manufacturing tolerances resulting in shape variations, defects, imperfections, non-uniform thermal expansion, natural wear, minor variations that are nevertheless recognizable as the qualified term, and other deformations.

Similarly, it will be understood that any numerical value provided herein represents an approximation of a real-world measurement, which is inherently capable of infinite precision. Real-world measurements can be subdivided into increasingly smaller units, and with sufficiently advanced measurement tools, additional digits could be added to any specified value. However, for practical purposes, any values provided in this specification are meant to represent the measurement within a reasonable degree of precision appropriate for the intended application. Accordingly, the use of specific numbers such as "15.0 mm" is intended to convey a practical level of precision, recognizing that the exact value may vary depending on the measurement tools and conditions.

Further, the use of qualifiers like "about" with numeric values should be understood to encompass variations from the literal value additionally taking into account variances within the stated level of precision that do not materially alter the function or purpose of the element. The amount of variance may vary, as dimensions specified with fewer significant digits or with a larger magnitude may encompass a broader range of values (e.g., ±5%), whereas numbers specified with greater precision or with a smaller magnitude may reflect the need for a higher degree of accuracy. The specific tolerance associated with "about" in each context is determined by the functional requirements of the element and the level of precision a person of ordinary skill in the art would typically associate with such measurements (e.g., ±1%).

One of ordinary skill in the art will understand how to apply geometric terms and numeric values, whether or not qualified by relative terms such as "generally," "about," and "approximately," to describe a reasonable range of variations from the literal term in view of these and other considerations appropriate to the context. The recitation of any particular value should not necessarily be understood as implying the criticality of the number or range. Additionally, the use of the conjunctive and disjunctive should not necessarily be construed as limiting, and the conjunctive may include the disjunctive, and vice versa.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An apparatus for treating bruxism in a human comprising:
   a main body element comprising a dorsal side and an opposing ventral side, and a buccal side and an opposing lingual side, said main body element further comprising a smooth exterior surface, and said main body element being sized, shaped, and dimensioned to be placed and passively retained within a buccal vestibule of an adult human;
   a knob element; and
   a treatment arm extending from said main body element to connect said knob element to said main body element, said treatment arm being sized, shaped, and dimensioned to be placed and held in a vacant retromolar space, and to inhibit upper and lower teeth from contacting each other without said adult human experiencing intolerable discomfort.

2. The apparatus of claim 1, wherein a maximum height between said dorsal side and said ventral side is effective to cause at least a portion of said main body element to extend above the visible base of the maxillary molars of said adult human when worn while said mouth is in a closed, resting position.

3. The apparatus of claim 2, wherein said maximum height is effective to inhibit said main body element from slipping past the teeth of said adult human when the jaw is opened to its maximum extent.

4. The apparatus of claim 3, wherein said maximum height is between about 28.0 mm and about 37.0 mm.

5. The apparatus of claim 4, wherein said maximum height is effective to cause at least a portion of said main body element to extend below the visible base of the mandibular molars of said adult human when worn while said mouth is in stasis position.

6. The apparatus of claim 5, wherein said maximum height is effective to cause said main body element to fill a portion of the space between the dorsal boundary of the maxillary buccal vestibule and the ventral boundary of the mandibular buccal vestibule of said adult human when worn while said mouth is in stasis position.

7. The apparatus of claim 6, wherein an end of said main body element distal said treatment arm curves inward from said dorsal side and said ventral side to connect at a first point having a maximum distance from said treatment arm.

8. The apparatus of claim 7, wherein a tangent line to said first point is generally perpendicular to a major horizontal axis of said main body element.

9. The apparatus of claim 8, wherein a maximum thickness of said main body between said buccal side and said lingual side is between about 6.0 mm and about 7.0 mm.

10. The apparatus of claim 9, wherein said apparatus comprises a smooth transition zone from said main body element to said treatment arm.

11. The apparatus of claim 10, wherein said buccal side and said lingual side curve inward towards each other at said distal end of said main body element to connect at a second point having a maximum distance from said treatment arm.

12. The apparatus of claim 11, wherein said first point and said second point are the same.

13. The apparatus of claim 12, wherein a maximum depth of said apparatus is between about 41.0 mm and about 48.0 mm.

14. The apparatus of claim 13, wherein a cross-section of said knob element is generally in the configuration of a curvilinear polygon.

15. The apparatus of claim 14, wherein said curvilinear polygon is selected from the group consisting of: a curvilinear triangle; a Reuleaux triangle; an irregular polygon.

16. The apparatus of claim 15, wherein a maximum height of said curvilinear polygon in a first direction is about 12 mm and a maximum width of said curvilinear polygon in a second direction generally perpendicular to said first direction is about 9 mm.

17. The apparatus of claim 16, wherein a cross-sectional area of said knob element is larger than a cross-sectional area of said treatment arm at a point adjacent said knob element.

18. The apparatus of claim 17, wherein a maximum dorsal cross-sectional width of said treatment arm is about 8.0 mm and a maximum frontal cross-sectional width of said treatment arm is about 10.0 mm.

19. The apparatus of claim 18, wherein a minimum distance between said adult human's upper and lower teeth without said adult human experiencing intolerable discomfort is selected from the group consisting of: less than about 3.0 mm; less than about 2.5 mm; less than about 2.0 mm; less than about 1.5 mm.

20. The apparatus of claim 19, further comprising at least one sensor in said functional arm and at least one transmitter communicatively coupled to said at least one sensor.

21. The apparatus of claim 20, wherein said sensor further comprising at least one sensor in said functional arm.

22. The apparatus of claim 21, wherein said sensor comprises a force sensor.

23. A system for treating bruxism comprising:
the apparatus of claim 22;
a computer having application software installed thereon, said application software programmed to receive wireless messages from said apparatus vis said transmitter and to display at least some of the content of said received wireless messages.

24. A method for treating bruxism comprising:
an adult human inserting the apparatus of claim 19 into the oral cavity of said adult human and positioning said main body element within said space defined by adjacent maxillary and mandibular buccal vestibules, and positioning said treatment arm among said soft tissue behind said molars;
said adult human slumbering while said apparatus is so inserted; and
upon awakening, said adult human removing said apparatus from said oral cavity.

* * * * *